(12) United States Patent
Naqvi

(10) Patent No.: US 9,471,700 B2
(45) Date of Patent: Oct. 18, 2016

(54) SYSTEM AND METHOD FOR MONITORING CHANGES IN DATABASES AND WEBSITES

(75) Inventor: Shamim A. Naqvi, Boston, MA (US)

(73) Assignee: TKSN HOLDINGS, LLC, Park Ridge, IL (US)

( * ) Notice: Subject to any disclaimer, the term of this patent is extended or adjusted under 35 U.S.C. 154(b) by 495 days.

(21) Appl. No.: 12/800,561

(22) Filed: May 18, 2010

(65) Prior Publication Data
US 2011/0289392 A1 Nov. 24, 2011

(51) Int. Cl.
G06F 17/00 (2006.01)
G06F 17/30 (2006.01)

(52) U.S. Cl.
CPC ..... G06F 17/3089 (2013.01); G06F 17/30899 (2013.01)

(58) Field of Classification Search
CPC ............. G06F 17/3089; G06F 17/30899; G06F 17/30889
USPC ................. 715/205, 854, 863, 864
See application file for complete search history.

(56) References Cited

U.S. PATENT DOCUMENTS

| | | | | |
|---|---|---|---|---|
| 5,347,295 A | * | 9/1994 | Agulnick et al. | 345/156 |
| 5,583,946 A | * | 12/1996 | Gourdol | 382/187 |
| 5,621,903 A | * | 4/1997 | Luciw et al. | 715/708 |
| 5,983,268 A | * | 11/1999 | Freivald et al. | 709/218 |
| 6,061,697 A | * | 5/2000 | Nakao | 715/229 |
| 6,249,606 B1 | * | 6/2001 | Kiraly et al. | 382/195 |
| 6,366,300 B1 | * | 4/2002 | Ohara et al. | 715/771 |
| 6,633,910 B1 | * | 10/2003 | Rajan et al. | 709/224 |
| 6,834,306 B1 | * | 12/2004 | Tsimelzon | 709/228 |
| 7,523,191 B1 | * | 4/2009 | Thomas et al. | 709/224 |
| 7,548,886 B2 | | 6/2009 | Kirkland et al. | |
| 7,561,535 B2 | | 7/2009 | Naqvi et al. | |
| 7,672,297 B2 | | 3/2010 | Naqvi et al. | |
| 7,724,753 B2 | | 5/2010 | Naqvi et al. | |

(Continued)

FOREIGN PATENT DOCUMENTS

EP 1372309 12/2003
WO 2007002604 1/2007

(Continued)

OTHER PUBLICATIONS

PCT/US2011/036891—International Search Report. mailed Aug. 19, 2011.

(Continued)

*Primary Examiner* — Stephen Hong
*Assistant Examiner* — Marshon Robinson
(74) *Attorney, Agent, or Firm* — Stuart H. Mayer; Mayer & Williams PC

(57) ABSTRACT

A system and method is described for constructing a differential web in which information including objects, numbers, or text in databases and web pages may be selected using pointing device movements. Once selected, objects may be designated to be monitored for changes, said changes being captured and made browsable on web-like constructs. Changes to the objects that satisfy certain user-stated criteria may result in notifications to specific users who may also setup automatic transactions on the changed objects. Recognition and control units recognize the selected objects and make them available to be executed in a Cloud Computing Environment. Objects may be selected from different web pages and hence monitoring can be effectuated across disparate databases and web pages.

20 Claims, 7 Drawing Sheets

(56) References Cited

U.S. PATENT DOCUMENTS

| | | | |
|---|---|---|---|
| 7,792,528 B2 | 9/2010 | Naqvi et al. | |
| 7,802,292 B2 | 9/2010 | Shaw | |
| 7,856,226 B2 | 12/2010 | Wong et al. | |
| 7,864,936 B2 | 1/2011 | Naqvi et al. | |
| 7,941,497 B2 | 5/2011 | Schmidt | |
| 8,170,534 B2 | 5/2012 | Naqvi et al. | |
| 8,432,899 B2 | 4/2013 | Naqvi | |
| 8,433,303 B2 | 4/2013 | Naqvi et al. | |
| 8,483,373 B2 | 7/2013 | Naqvi et al. | |
| 8,553,866 B2 | 10/2013 | Naqvi et al. | |
| 8,611,334 B2 | 12/2013 | Naqvi | |
| 8,666,894 B1 | 3/2014 | Buch et al. | |
| 8,730,945 B2 | 5/2014 | Naqvi | |
| 2002/0130176 A1 | 9/2002 | Suzuki | |
| 2004/0030741 A1* | 2/2004 | Wolton et al. | 709/202 |
| 2004/0078464 A1* | 4/2004 | Rajan et al. | 709/224 |
| 2004/0083424 A1* | 4/2004 | Kawai et al. | 715/501.1 |
| 2004/0137925 A1 | 7/2004 | Lowe et al. | |
| 2004/0158618 A1 | 8/2004 | Shaw | |
| 2005/0093868 A1* | 5/2005 | Hinckley | 345/502 |
| 2005/0102358 A1 | 5/2005 | Gold et al. | |
| 2006/0039586 A1* | 2/2006 | Takematsu et al. | 382/115 |
| 2007/0055766 A1* | 3/2007 | Petropoulakis et al. | 709/224 |
| 2007/0055785 A1 | 3/2007 | Stevens | |
| 2007/0073580 A1 | 3/2007 | Perry et al. | |
| 2007/0073591 A1 | 3/2007 | Perry et al. | |
| 2007/0073592 A1 | 3/2007 | Perry et al. | |
| 2007/0073593 A1 | 3/2007 | Perry et al. | |
| 2007/0073599 A1 | 3/2007 | Perry et al. | |
| 2007/0073758 A1 | 3/2007 | Perry et al. | |
| 2007/0281713 A1 | 12/2007 | Mullen | |
| 2008/0114878 A1* | 5/2008 | Gopalkrishnan et al. | 709/224 |
| 2008/0162346 A1 | 7/2008 | Aaron et al. | |
| 2008/0164308 A1 | 7/2008 | Aaron et al. | |
| 2008/0209000 A1 | 8/2008 | Schmidt | |
| 2008/0232690 A1* | 9/2008 | Saund et al. | 382/187 |
| 2009/0177381 A1* | 7/2009 | Taniguchi et al. | 701/208 |
| 2009/0222907 A1 | 9/2009 | Guichard | |
| 2009/0264131 A1 | 10/2009 | Wu | |
| 2009/0265196 A1* | 10/2009 | Dewar et al. | 705/7 |
| 2009/0271514 A1* | 10/2009 | Thomas et al. | 709/224 |
| 2010/0057485 A1 | 3/2010 | Luft | |
| 2010/0218104 A1* | 8/2010 | Lewis | 715/736 |
| 2010/0299451 A1 | 11/2010 | Yigang et al. | |
| 2011/0077028 A1 | 3/2011 | Wilkes et al. | |
| 2011/0078560 A1* | 3/2011 | Weeldreyer et al. | 715/255 |
| 2011/0213823 A1 | 9/2011 | Schmidt | |
| 2011/0257973 A1 | 10/2011 | Chutorash et al. | |
| 2012/0214463 A1 | 8/2012 | Smith et al. | |
| 2013/0295908 A1 | 11/2013 | Zeinstra et al. | |

FOREIGN PATENT DOCUMENTS

| | | |
|---|---|---|
| WO | 2011146544 | 11/2011 |
| WO | 2012012599 | 1/2012 |

OTHER PUBLICATIONS

PCT/US2011/044787—International Search Report. mailed Nov. 28, 2011.

Ken Hinckley, et al., Design and Analysis of Delimiters for Selection-Action Pen Gesture Phrases in Scriboli. In Proc. of the SIGCHI Conference on Human Factors in Computing Systems, CHI '05, pp. 451-460, Jan. 1, 2005.

* cited by examiner

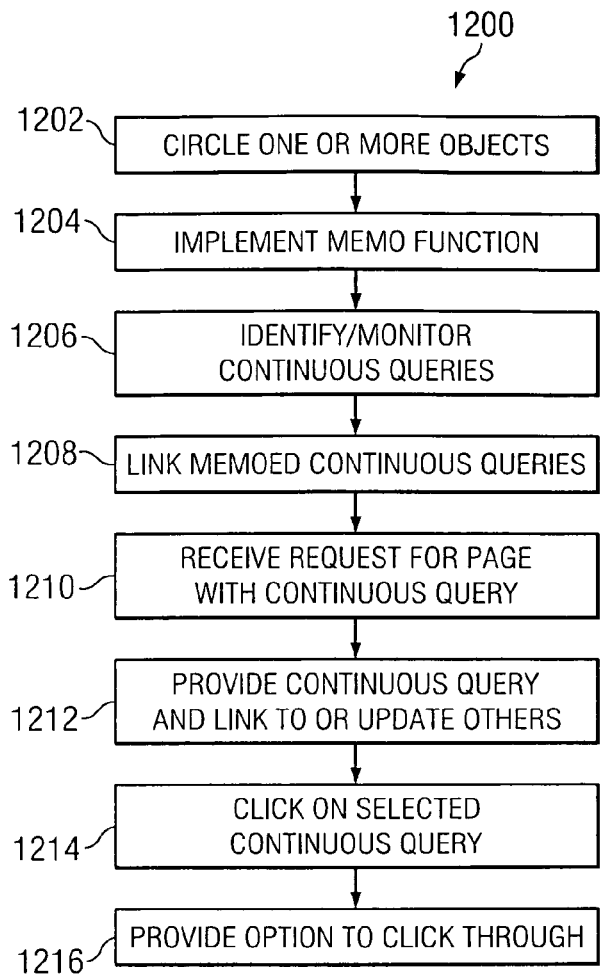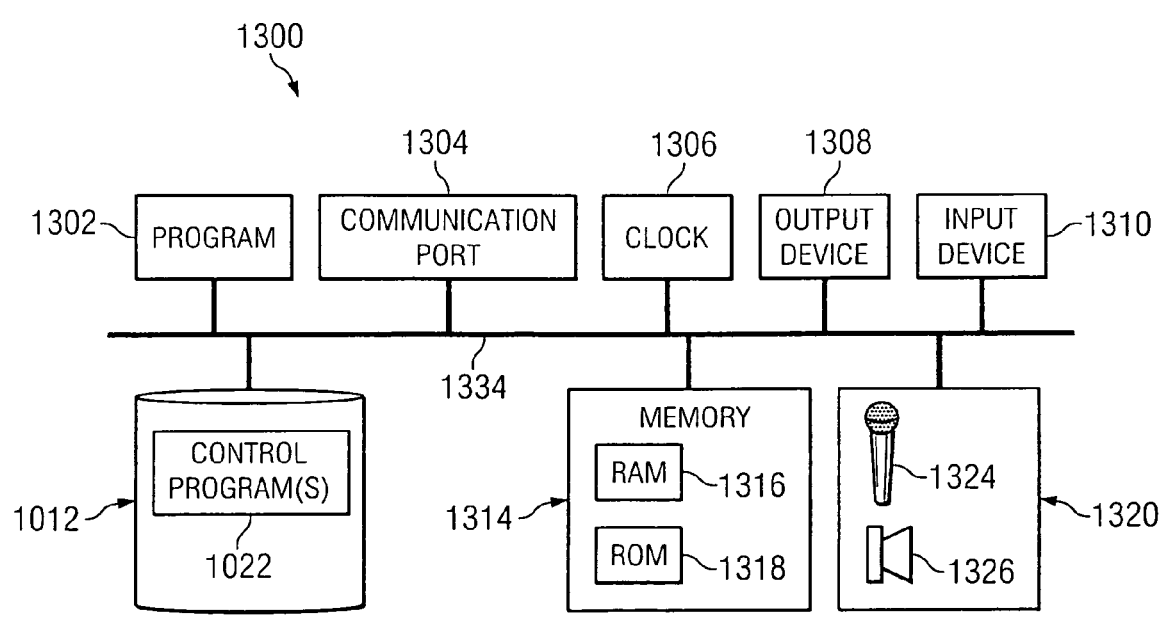

SYSTEM AND METHOD FOR MONITORING CHANGES IN DATABASES AND WEBSITES

FIELD OF THE INVENTION

The present invention relates generally to monitoring changes to information in a database or on web pages by allowing the construction of a web of changes, said changes being browsable as an overlay on the regular Internet, and to selecting objects, numbers, or text on a computer screen by employing pointing device gestures; imposing, selecting or stating a set of conditions on the selected objects, numbers or text; and monitoring the selected information in light of the stated conditions.

BACKGROUND OF THE INVENTION

In modern times, information has become an extremely valuable commodity. Before the widespread use of computers, people commonly relied on television, radio, and periodicals such as newspapers as a main source of information about topics of all kinds. Even back then, the amount of information that a person received from these sources was too much for that person to retain without some type of assistance. For example, someone wanting to remember information from a newspaper article might clip out the article and place it aside or circle it for future reference.

With the widespread use of computer technology, particularly as it relates to the Internet, people now have easy access to seemingly unlimited amounts of information concerning any topic. People can now use the Internet to quickly learn about any topic they choose. If a person wants to use information found on the Internet for future reference, he or she may save its Internet address or bookmark its Internet page.

One important aspect of utilizing the saved information is monitoring that information to see if and when it changes so that a particular action may be taken. A shopper may wish to monitor advertisements for certain products and to be alerted, i.e., notified, when they go on sale. The shopper may then consider purchasing those products. Moreover, the shopper may only want to be alerted if the price of the selected item satisfies certain conditions, e.g., the price drops by 20%. A concertgoer may wish to be notified if changes are made to the published program. The examples of why someone may wish to monitor changes in information are countless.

One often cited advantage of the "regular" Internet is that it makes a large amount of information easily accessible through the use of computers and other end user devices. Because change is an integral aspect of information, it would be tremendously useful to also have a "differential Internet" or a "differential web" that allows consumers to just as easily browse and navigate through the changes that occur in the underlying Internet or web (and, since many on-line databases now provide web front ends, the same applies to databases as well).

However, the systems and methods in the prior art capable of monitoring information in databases or on Internet sites for changes to that information are severely limited in their functionality. Only certain types of information may be monitored and, generally speaking, only the database administrator, and not the end user, is notified of any changes that occur. Furthermore, the processes available for selecting the information to monitor are not satisfactory. To monitor most types of information on the Internet for changes, a user must periodically visit a particular website and visually check to see if the information has changed. This type of system is cumbersome, error-prone, tedious to use, and time-consuming. Accordingly, it would be desirable to remove any constraints on what information may be monitored on the Internet and to simplify the process for selecting the information to monitor.

The features and advantages of the present inventions will be explained in or will be apparent from the following description of the preferred embodiment considered together with the accompanying drawings.

SUMMARY OF THE INVENTION

Embodiments of the present invention address the deficiencies of the prior art systems for monitoring changes made to information in databases or in web pages by providing a system having a simplified interface that may be used to select the information that is to be monitored. This system also has the ability to monitor changes in any information to be found in a plurality of distinct databases and web pages. This system responds to changes made to information which satisfies consumer-stated criteria by notifying the consumer and, in some cases, by taking actions on behalf of the consumer.

In one embodiment, a user is enabled to monitor the content of a web page on the Internet for a change in its information content, such as prices, weather conditions, and the like. Corrections to incorrect information may also be monitored. The user first uses an input device to "circle" or "encircle" the information to be monitored—i.e., numbers, text, or a graphical representation of an object to be monitored. The user then imposes a set of conditions on the selected information or object denoting what specific changes are to be monitored. The present invention envisages a system that can execute a large number of simultaneously- and concurrently-executing monitoring activities, thereby monitoring numerous objects in multiple different databases and web pages.

In accordance with another aspect of the present invention, a user may encircle an object, such as a graphic, number, or word, on a computer monitor using a pointing device and then impose a set of conditions denoting the type of object changes that are to be monitored. The user may choose to be notified if the conditions are met by changes to information associated with the object. Furthermore, if and when the information changes, the user can explore related consequences of that change and, in some cases, take specific actions because of the changes, e.g., purchase an item whose price was selected for monitoring.

The inventions discussed herein allow and embody the construction and browsing of, and the execution of transactions upon, a "differential web" that exists as an overlay to the conventional web or Internet. The described embodiments define a method and system for monitoring changes in information contained in databases and/or web pages. In general, the changes and the information to which the changes relate, together with the programs that periodically monitor this information and notify the user of these changes (or take other user-specified action in response to these changes) may be said to constitute a differential web. The system allows these changes to be browsed and manipulated as elements of this web. That is, the embodiments of the present invention allow for the identification and the selection of one or more objects on a web page that a user is interested in monitoring and creating a web of pages representing the changes in the data base over time.

BRIEF DESCRIPTION OF THE DRAWINGS

The inventions will now be more particularly described by way of example with reference to the accompanying drawings. Novel features believed characteristic of the inventions are set forth in the claims. The inventions themselves, as well as the preferred mode of use and further objectives and advantages thereof, are best understood by reference to the following detailed description of the embodiment in conjunction with the accompanying drawings, in which:

FIG. 12 is a flowchart illustrating the operation of an embodiment of the present invention.

FIG. 13 is a diagram of an exemplary computer suitable for use in accordance with the embodiments of the present invention.

DETAILED DESCRIPTION OF THE EMBODIMENTS

Figure 1:
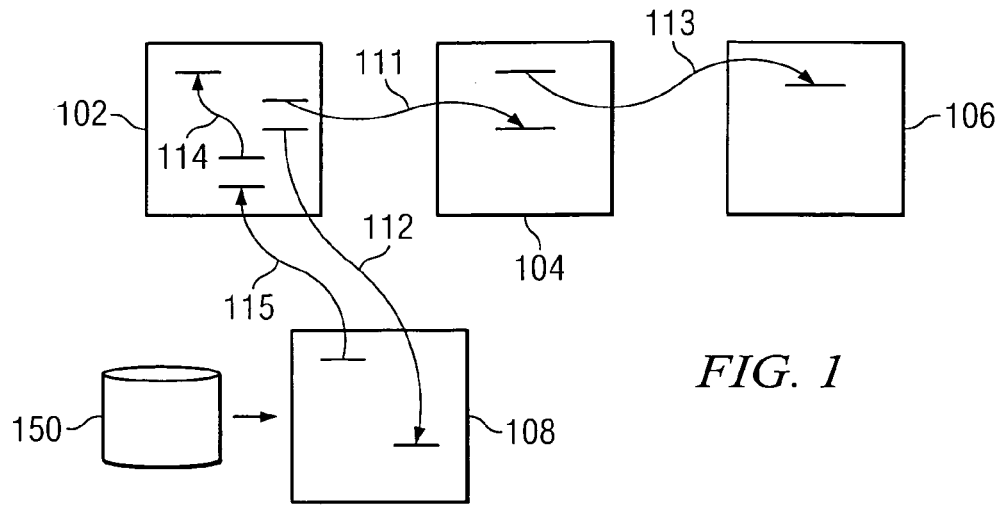
FIG. 1 shows a visual representation of the Internet with linked web pages.

The present invention relates to a system and method for monitoring information elements on a web page and for browsing the changes as web information.

In the descriptions that follow, we shall adopt the following usage of terms (however, the inventions presented herein shall not necessarily be limited by such usage): The words "web page" and "database," in general, denote a set of information objects being displayed on a computer monitor and accessible through a web browser. The act of identifying and selecting information objects to be monitored, in general, relies upon pointing devices attached to or in communication with a computer, or a handheld device such as a mobile handset. Gestures will be defined on pointing devices that allow objects to be selected and that also allow the selection to be visually displayed upon the monitor.

Users are allowed to select multiple objects within a web page or several web pages; in some cases, the user may group a set of selected objects into a single selected object. If a web page is loaded and displayed by a web browser, and if one or more objects on that web page have been selected, the system causes the web browser to display the selected objects as browsable objects in their own right in the sense that such objects may be "clicked" upon, and this action may then lead to pop-up menus or web pages that contain components of the selected object (such as price, color, etc.). These components may be called "meta-information" relating to a selected object.

Once objects have been selected, the system retrieves and displays meta-information associated with the selected objects. In some cases the system may use pre-determined meta-information. The user is then permitted to make specific selections, which may be called "conditions," by actuating user-selectable fields, values, and conditions in pop-up menus. The meta-information may include true/false (Boolean) or arithmetic criteria on attributes contained in the pop-up menus. In some cases the pop-up menu may contain pre-defined attributes denoting procedures, such as NOTIFY, EXECUTE, etc., that represent specific actions which are defined by procedures in the underlying web sites supporting that information element.

The monitoring actions imposed upon the selected objects may be carried out upon the objects by the computer where the web page is displayed, by a web page's host web site or host database where the information element resides, or by a different collection of computers, such as a Cloud Computing Environment (CCE), defining a "differential web" (as described below).

In some embodiments, the selected object may be an item for sale, and the user may wish to monitor changes to its price. Moreover, the user may wish to impose some criteria upon the price changes, such as a 20% decrease in the price. The described embodiments also provide that the selected object may be one or more words or numbers on a page of a website or one or more characters of text in HTML or other code. More than one object may be selected from a plurality of web pages, and the selected objects may be grouped together to satisfy a set of defined conditions. Thus, for example, a flight reservation in an airline database system may be monitored for names of "suspicious" individuals, the names being obtained from monitoring another web page.

For illustrative purposes the Internet may be visualized as a collection of inter-linked web pages shown in FIG. 1. Shown are web pages 102, 104, 106, 108. The web pages 102, 104, 106, 108 are inter-linked by so-called hyperlinks 111, 112, 113, 114, 115. Selecting or clicking on a hyperlink allows navigation within a web page or to other web pages. Web pages may be defined by scripting languages such as HTML or may be dynamically generated, completely or partially, from a database system 150, using appropriate generation tools such as Flash or modern scripting languages such as PHP, etc. A web browser is a computer program, such as Mozilla Firefox or Microsoft Internet Explorer, that renders web pages on a computer display. As will be discussed in greater detail below, embodiments of the present invention allow for user creation of a navigable differential Web overlay of interlinked Web pages created by selecting/encircling predetermined objects.

Figure 2:
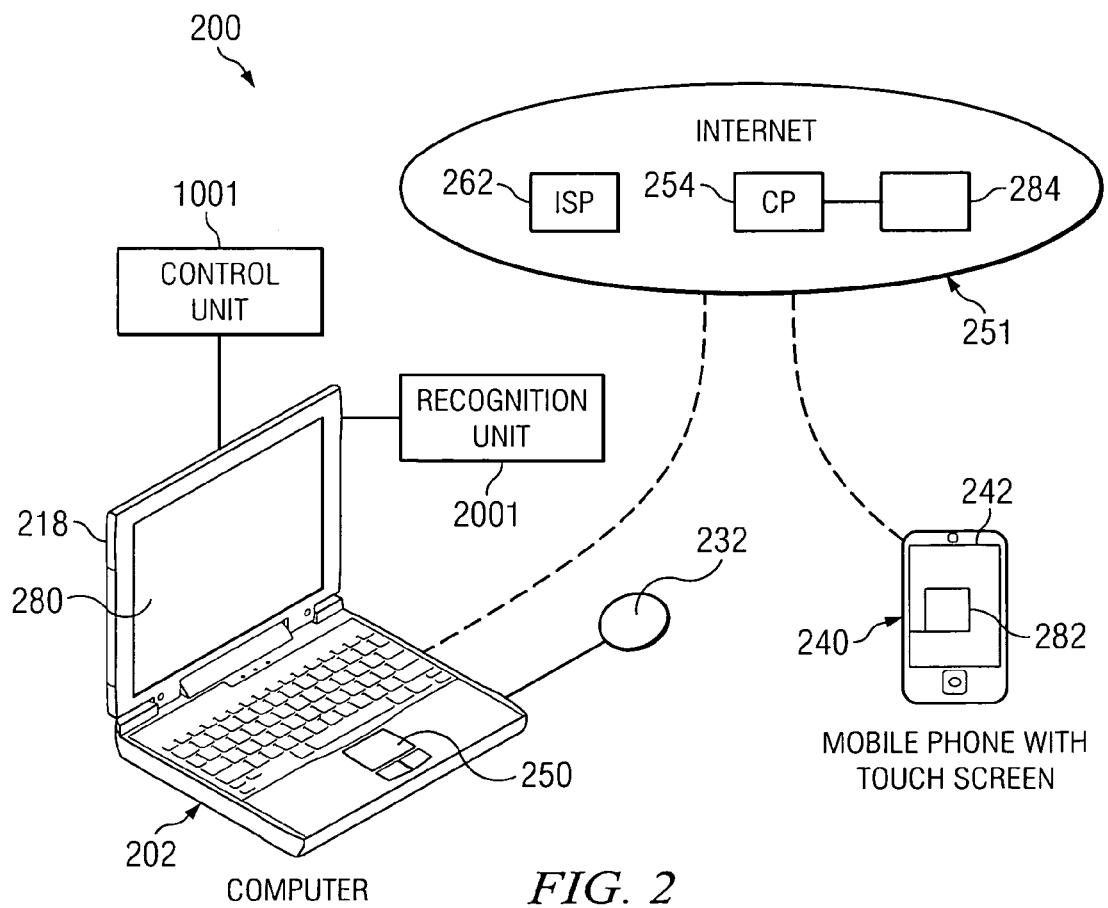
FIG. 2 illustrates a system including a computer with a pointing device and also including object recognition and control components in accordance with various embodiments of the present invention.

FIG. 2 illustrates a system 200 including computer and a mobile handset unit that can be used to implement the teachings of the present invention. In particular, FIG. 2 shows a computer 202 including a monitor 218 and one or more input devices such as a touch pad 250 and/or cursor pointing device 232 such as a mouse or track ball or the like. The computer 202 may be embodied as any of a variety of personal computers from any of a variety of manufacturers. It is noted that some computers may include both a touchpad and a mouse or merely a mouse.

The figure also shows a mobile handset 240 with a touch screen 242, although mobile handset 240 may be provided with other cursor pointing devices, as well. The mobile handset may be implemented as a cellular telephone or other device capable of communicating over or with the Internet.

Computer logic associated with computer 218 embodied as a control unit 1001 and recognition unit 2001 undertakes specific actions in accordance with embodiments of the present invention, as will be described in greater detail below. Similar control units and recognition units may be provided with the mobile phone 240, but are omitted for the sake of convenience.

The computer 202 and the mobile phone 240 may be in communication with the Internet 251. Thus, computer 202 and mobile phone 240 may be used to display web pages 280, 282, respectively. Internet 251 may be populated by service providers 252 and content providers 254. Service providers 252 and content providers 254 may implement servers, database systems, and web pages accessible using the computer 202 and mobile phone 240 and in accordance with embodiments of the present invention. Typically, such servers, database systems, and Web pages are implemented as one or more computers and computer code implementing control logic.

The service providers 252 and content providers 254 may implement or maintain meta-information 284 in association with objects on web pages, as will be explained in greater detail below.

Embodiments of the present invention will be described with reference to the computer 202, it being understood that mobile handset 240 may be used to implement the teachings of the present invention as well.

As can be appreciated, most modern computers use one or more pointing devices such as a mouse, touch pad, touch screen, or a light pen. A pointing device "gesture" is a combination of pointing device movements and clicks which are together recognized by computer logic as a specific command. The computer logic then carries out the dictates of the command. An example gesture is a "drag" in which a mouse button is held down, the mouse is moved, and the held button is released. This gesture is recognized by computer logic as a specific command, and the command causes one or more objects displayed upon the monitor to be "dragged" across the display.

Gestures can involve vertical and horizontal movements from a known location. For example, a typical mouse has two wheels that track horizontal and vertical movements. In a typical optical mouse, a light beam is interfered with when the vertical and horizontal wheels rotate, causing signals to be sent to computer logic that calculates the corresponding horizontal and vertical distances traversed by the mouse in the movement. These distances are then used to recognize the gesture being attempted and the command corresponding to that gesture. In multi-touch devices, two sets of horizontal and vertical distances are utilized.

Embodiments of the present invention define a gesture called a "circular," "circle," or "encircling" gesture, which may be used to circle an object on the computer monitor 218. In some embodiments, to make this gesture on a touch pad 250, a user employs his thumb and forefinger. The gesture may start with the thumb and forefinger held in close proximity, i.e., together, at a known place on the touch pad 250. The gesture may entail the movement of the thumb and forefinger together and simultaneously in a downward and outward direction, achieving a pre-determined and programmatic horizontal distance from the vertical, referred to herein as the bifurcation distance, continuing in a downward direction decreasing the bifurcation distance, and coming to rest in close juxtaposition. It is noted that the orientation of the gesture may be varied. For example, the movement of the thumb and forefinger may be in an upward and outward direction; or sideways and outward; and the like. Thus, the figures are exemplary only.

Figure 3A:
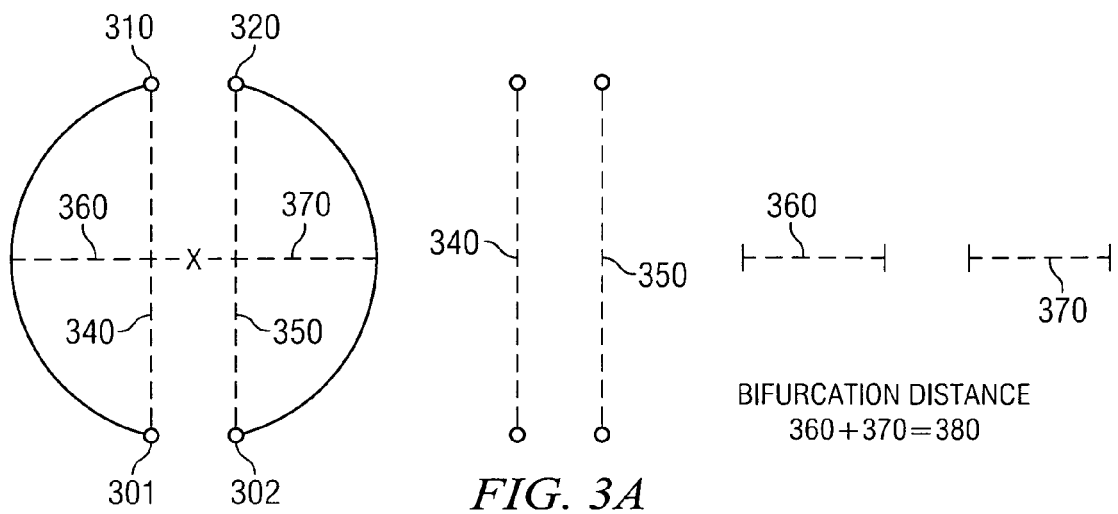
FIG. 3A and FIG. 3B schematically illustrate a procedure for capturing and recognizing a circular or encircling gesture in accordance with the embodiments of the present invention.
Figure 3B:
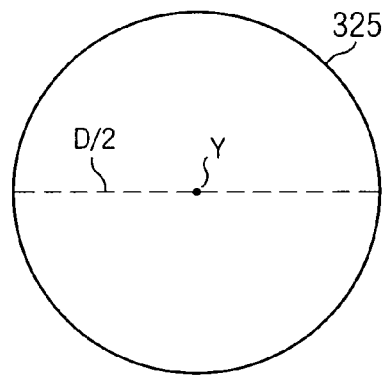

This process is illustrated schematically and with greater particularity in FIG. 3A and FIG. 3B. Shown in FIG. 3A are exemplary and relative starting positions for a thumb 310 and forefinger 320, positioned somewhat "above" or otherwise removed from an intended object X being selected. The object X may be one or more graphics, icons, pictures, texts, or code, etc. The user circles the object X by moving or sliding thumb and forefinger along the arcs to ending positions 301 and 302 respectively. The dashed lines 340 and 350 represent the vertical distances computed by the touch pad device. The horizontal distance 360 to 370 is the bifurcation distance, i.e., the distance the actual curve shifts from the vertical. The sum of the lengths 360 and 370 is denoted by reference numeral 380.

The object X may be determined to have been "circled" by the circular gesture as follows:
Choose the longest of the lengths 340, 350, and 380.
Let the chosen longest length be denoted by D.
Determine the midpoint of D, say Y (FIG. 3B).
The circle 325 with center at Y and radius D/2 "circles" the object X, as shown in FIG. 3B. That is, objects within the circle 325 are deemed circled for purposes of evaluating the gesture.

Alternatively, in simpler terms, since the touchpad 250 gives a horizontal and a vertical distance, the system can construct an approximate square having dimensions corresponding to the horizontal and vertical distances, and then draw a circle that encloses that square. It is noted that, while discussed in terms of a "circle," the object may be "circled" by any regular or even irregular shape.

Whereas the above method has been described with reference to a multi-touch touch pad, the general principle applies to other pointing devices also. For example, on a two-button mouse (not shown), a user can press and hold both the left and right buttons, place the mouse cursor at a position above (in an exemplary depiction only) the object to be selected, and move the mouse in a clockwise or counter-clockwise circle. When the circular gesture is completed, the two buttons may be released. This gesture also generates a vertical and horizontal distance from a known starting point and can be used to compute a circle.

Once the gesture has been recognized by the recognition unit 2001 (FIG. 2), it sends the distance and position information to the control unit 1001. In some embodiments, the control unit 1001 computes the circle as described above and transmits a command to graphical control systems (not shown) in the computer to display a circle or other encircling indicia on the monitor.

Secondary gestures may be defined on the circle generated to modify the selection, e.g., by allowing the circumference of the circle to be dragged to enlarge or decrease the area of the circle or change its shape.

More than one object may be selected by a circular gesture. The term "scope" is used below to indicate the set of objects selected by using the circular gesture.

It is envisaged in the present invention that participating databases and web sites of service and content providers 252, 254 (FIG. 2) will "publish" meta-information 284 to the user's web browser concerning objects that appear on the screen and that may be circled. "Meta-information" refers to schema information and attributes of these objects. Once an object is selected, i.e., falls within the scope of a circular or encircling gesture, the published meta-information concerned with the object can be retrieved. Practitioners in the art will understand "publish" as a well-defined and known mechanism by which systems make information available to other systems and machines. In accordance with embodiments of the present invention, users can define criteria of the meta-information that can be monitored by the system and can be notified when the criteria are met.

As an example, suppose a woman is shopping for a dress and sees a dress that she likes and may want to purchase displayed on a web page. In the described embodiment, she may circle the dress ("object") on the computer monitor using her mouse, and the system will recognize that she has done so and show the circle on the computer monitor.

In response to her circling the dress, the meta-information 284 published by the website, if any, that describes the dress will be retrieved from the published meta-information mechanism, processed, and encapsulated into a pop-up menu (as will be described in greater detail below) and displayed over the web page 280 (FIG. 2).

The pop-up menu may be manipulated by the user to specify monitoring conditions on the dress. For example, if the price of the dress is too high for the woman's liking at that time, she may manipulate the pop-up menu to specify that price reductions of the dress under consideration be monitored and that she is to be alerted if a later price reduction satisfies her specified conditions. The woman may also request the system to purchase the dress for her if that happens. The concepts illustrated in this example may also be used to notify any user that changes have taken place in such things as text on a web page, HTML code corresponding to a website, or any other information stored in a web page or web-based database.

If the web site or database containing a selected object does not participate in the "publish" mechanism, and hence no meta-information is available for the selected item(s), the system may offer the user a pre-determined meta-information template, depending upon the nature of the object. For example, selecting an object for purchase could automatically result in the system monitoring price, color, and other attributes of the object visible on the web page. The pop-up mechanism is an exemplary depiction of the meta-information mechanism embedded in an embodiment of the present invention, and different mechanisms may be employed in other embodiments.

Figure 4A:
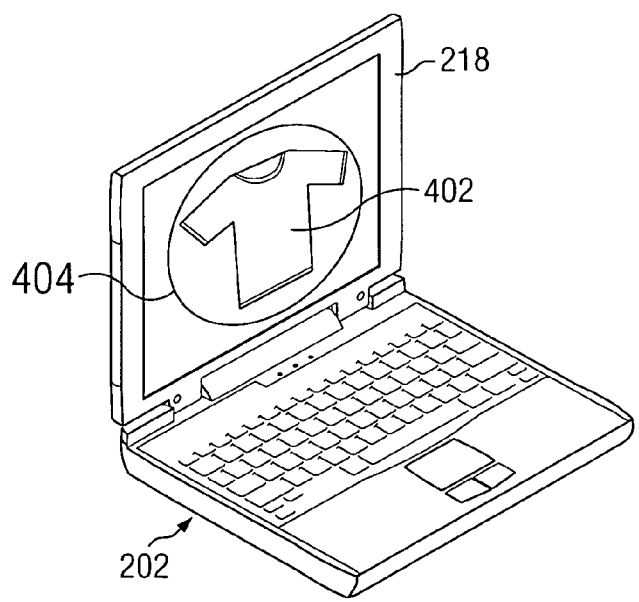
FIG. 4A shows an object on a computer monitor after it is selected by a circular or encircling gesture in accordance with the embodiments of the present invention.

Operation of such an embodiment is shown with greater particularity with reference to FIG. 4A, which illustrates a computer 202 and an object, in this example, a dress 402, visible on the computer's monitor 218. The customer would use the cursor pointing device 232 or track pad 250 shown in FIG. 2 to initiate a circular gesture as described above. The contents of the computer monitor 218 would then appear as shown with an object, the dress 402, on the computer monitor 218 encircled by circle 404. Again, the circle 404 may be a circle or other predetermined shape.

In operation, the recognition unit 2001 (FIG. 2) recognizes the circling and communicates with the control unit 1001 to request retrieval of meta-information, if any, associated with the dress 402 from the content provider. In some embodiments, the meta-information is provided to the user via a pop-up menu, such as that shown at 438 in FIG. 4B.

Figure 4B:
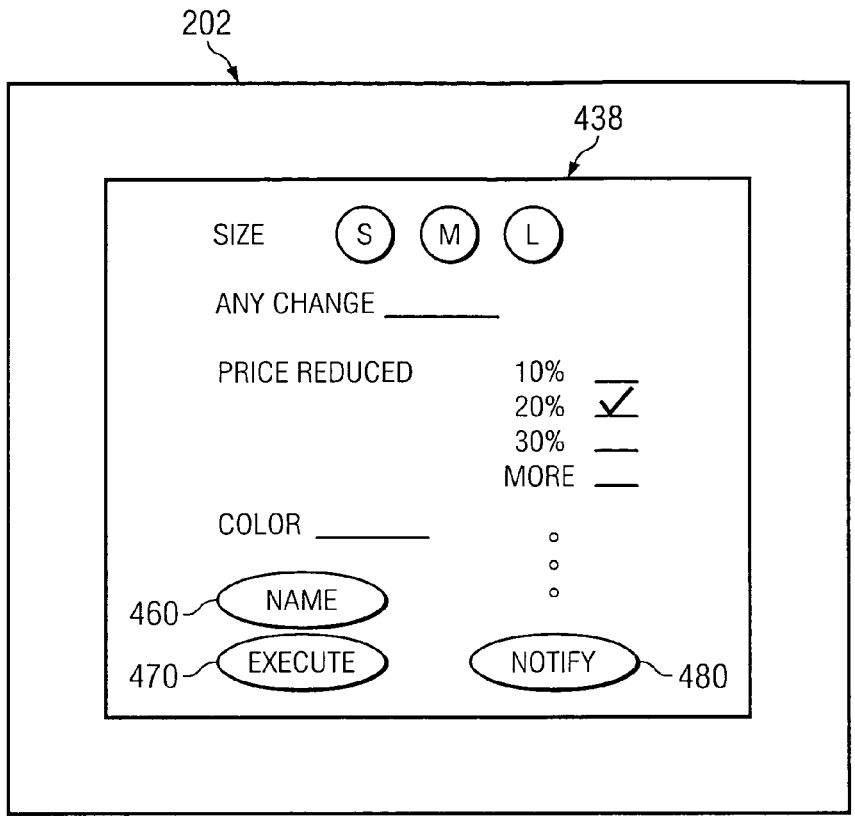
FIG. 4B illustrates a pop-up menu associated with meta-information associated with an object selected on a computer monitor in accordance with the embodiments of the present invention.

In particular, FIG. 4B shows a pop-up menu 438 on the computer monitor 418 after the dress 404 has been selected. In the example illustrated, the pop-up menu 438 appears in tabular form, and the user may now choose what to monitor. While shown on its own screen or in its own window, the meta-information may also be displayed to the user in a frame or at the edge of a frame that also shows the dress or other object selected. Also, the meta-information may be different depending upon the object encircled and the nature of the underlying item which the object represents.

As such, the pop-up menu 438 may display a variety of attributes depending on the nature of the object encircled. In the example illustrated, the attributes include Price, Color, and Size. The attributes may be selected by the user, for example, by "clicking" with the cursor pointing device. Selected attributes can be identified on screen by check marks, as is illustrated next to the "Price" attribute. In addition, the computer may display NAME, NOTIFY, and EXECUTE radio buttons, as will be explained in greater detail below.

In accordance with the present invention, NOTIFY and EXECUTE procedures are defined by the content provider's web site—the web site that publishes the meta-information. If a NOTIFY radio button is clicked, the NOTIFY procedure asks the web site (or some other monitoring utility) to notify the user of particular events. The web site (or other monitor) may gather additional information from the user by asking the user to complete a certain online form, for example. In this figure, the user has chosen to monitor the price of the dress 404 for any changes by checking the "price" attribute and by clicking the NOTIFY button. The user will then be notified automatically when the price of the dress 404 changes by periodic execution of monitoring utilities associated with and placed into operation by the NOTIFY procedure.

FIG. 4B also includes an EXECUTE 470 radio button. This is a special radio button bound to a procedure offered by the website that executes a transaction on behalf of the user. For example, clicking the EXECUTE button 470 can initiate purchasing the dress. As in the case of the NOTIFY button 480, the EXECUTE procedure may ask for additional information from the user, e.g., account and payment information, in order to fulfill the request. It may also allow the user to select a price level to which the price of the dress must fall before such a purchase is initiated.

FIG. 4B also includes a NAME 460 radio button that provides a capability in the present embodiment to assign a unique identifier, i.e., an ID, to the objects within the scope of a circular gesture. For example, the user may click this button and be provided with a dialog screen or field for entering a name for an object. The system, i.e., the content provider web site (or other monitoring entity) receives and remembers the assigned identifiers, i.e., the "names," and allows the names to be used in other contexts as is described below. An object that is not named by the user is assigned a name by the system. A named object is said to have been "memoed," i.e., it is remembered.

Figure 4C:
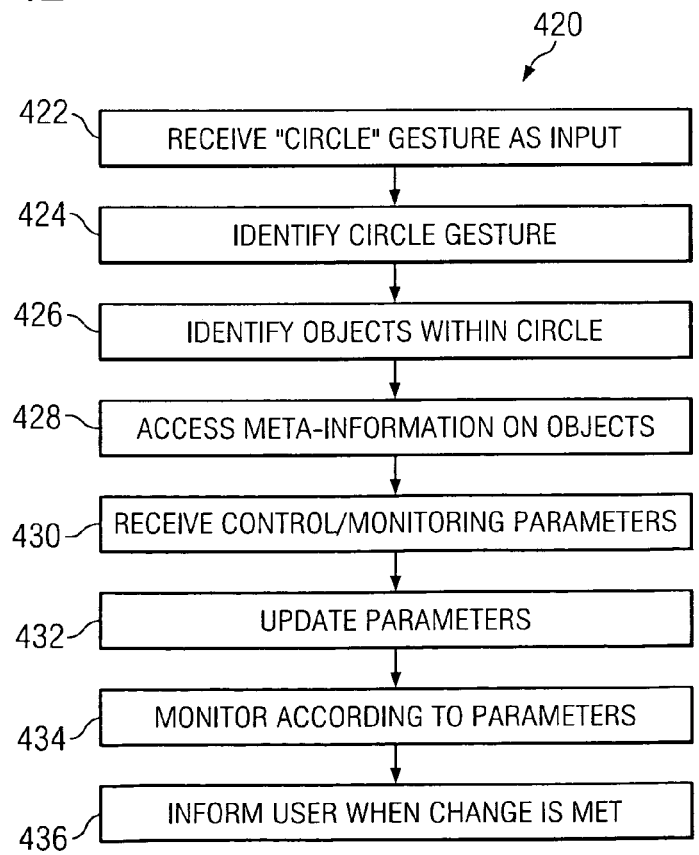
FIG. 4C is a flowchart illustrating the operation of an embodiment of the present invention.

Turning now to FIG. 4C, a flowchart 420 illustrating operation of an embodiment of the present invention is shown. The particular arrangement of the elements in the flowchart 420 is not meant to imply a fixed ordering of the elements; other embodiments can be realized by arranging them in any order that is practicable.

In a process step 422, a "circular" gesture is input and is received by the recognition unit 2001 (FIG. 2). As noted above, the circular gesture may be received via a touch pad or mouse or other cursor pointing device.

In a process step 424, the recognition unit 2001 identifies the gesture as corresponding to various predetermined criteria identifying the gesture and its corresponding contours and dimensions, i.e., in a manner similar to that discussed above. Once the circular gesture is identified, the control unit 1001 identifies one or more objects within the scope of the circle in a process step 426. (The control unit 1001 may do so, for example, with embedded coding and/or other identifiers). The system may identify and store the objects by name or other indicia.

Next, in a process step 428, the system accesses meta-information corresponding to the objects encircled. As noted above, this may be accomplished by the control unit 1001 or by a remote service or service provider. In a process step 430, the computer displays, for example, in a pop-up menu, the control monitoring parameters that reflect the received meta-information, which the user can then select. That is, the meta-information is published to the user's computer. As noted above, this can be in the form of one or more clickable pop-up menus or frames or other viewable windows or portions of windows.

The user can then input criteria and select particular actions, including the naming of the objects, in a process step 432. The objects can then be monitored for changes or other updates in a process step 434. As noted above, either the local control unit or a remote service can perform this monitoring task.

Finally, in a process step 436, the system can detect changes and inform the user if there have been any changes to the parameters, i.e., when the selected criteria match that provided by the user. This informing step can be accomplished via a pop-up window, e-mail, instant messaging, or any other suitable user message delivery technique.

As noted above, a circular gesture may be used to select one or more objects on a web page. In accordance with embodiments of the present invention, a "memo" function executed by the control unit 1001 remembers all the objects so selected. If the user navigates to another web page, in some embodiments and as will be explained in greater detail below, the user is allowed to recall the memoed objects from the current session and create a "compound object" including some or all of the objects selected previously with the objects selected on the current page.

In some embodiments, the objects within the scope of a circular gesture are considered to be "web objects" in their own right, in the sense that the objects may themselves be browsable by the user in a differential web space.

As has been discussed above, one or more objects may lie within the scope of a circular gesture. Some embodiments of the present invention may display objects within the scope of a circular gesture as a "cluster" of objects. Thus, once a user has selected an object, embodiments of the present invention may provide an editing window or other facility for clustering and editing objects and clusters.

Figure 5A:
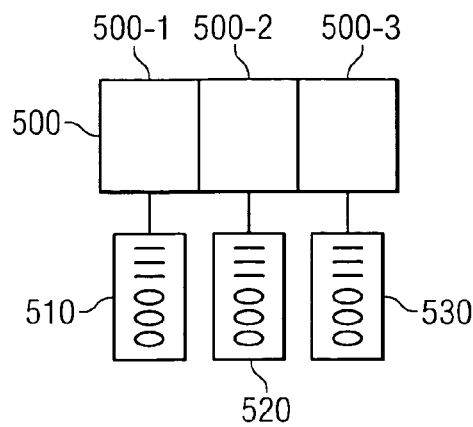
FIG. 5A shows a cluster object with its constituent elements and their associated pop-up menus in accordance with the embodiments of the present invention.
Figure 5B:
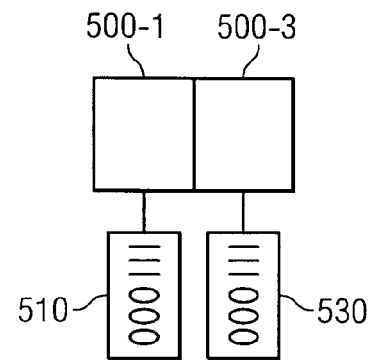
FIG. 5B shows a cluster object with one constituent element removed from the cluster in accordance with the embodiments of the present invention.

For example, FIG. 5A illustrates an exemplary depiction of a cluster of objects 500 including the individual elements or objects 500-1, 500-2, and 500-3. Each element or object of this cluster may have its meta-information displayed as a pop-up menu or window 510, 520, 530, respectively. In addition, the user may be allowed to exclude, i.e., remove, an element, from a cluster, say the element 500-2, resulting in the display shown in FIG. 5B.

In accordance with an embodiment of the present invention, such a cluster of objects may be called a "Conditional Query (CQ)." In some embodiments, a CQ is a browsable object in the sense that when a web page on which a CQ has been defined is loaded into a web browser, the CQ is displayed on that page at a suitable location, e.g., in the margin or in a separate frame. Moreover, the CQ, when displayed, is clickable and leads to other pages with which the CQ is linked when the CQ contains other objects defined on other pages.

When a web page on which a CQ has been defined and memoed previously is displayed, this embodiment of the present invention allows the display of the CQ at a suitable location on the web page, e.g., in the margin. It is also envisaged that the CQ may be associated with other CQs defined on other pages.

Figure 5C:
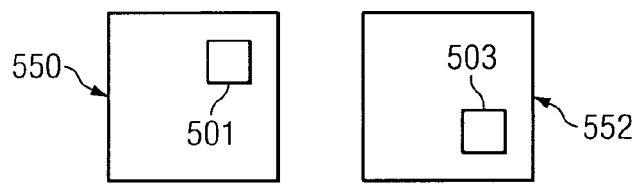
FIG. 5C shows two selected and linked objects on two different web pages in accordance with the embodiments of the present invention.

For example, FIG. 5C illustrates an exemplary CQ 501 defined on a web page 550. The name of the CQ 550 may be assigned by a user or the system. Also shown is another web page 552 that is associated with a CQ 503. Whenever either page 550 or 552 is loaded into a browser, the corresponding CQs 501 and 503 respectively will also be displayed at the same time. In other words, the system accesses its databases to find if the particular user has memoed a CQ on that web page; and if so, it is displayed.

If a displayed CQ is clicked, in some embodiments an option is provided to the user to link it to other "memoed" (named) CQs. That is, the system (the service or content provider) accesses a database for all of the CQs the user has memoed, even if they are not associated with the web page the user is currently browsing. If the web page 550 is loaded, the CQ 501 will be displayed; and if CQ 501 is clicked, a choice will be presented to the user to "link" the CQ 501 to the CQ 503 (since the CQ 503 has been previously memoed) on the web page 552. Thus, in some embodiments, as will be discussed in greater detail below, the "web page" or window that has been associated with a CQ can be associated with another CQ and its web page—linked on the fly via a hyperlink for easier browsing.

Another option presented to users when a CQ is displayed is to load pages that are linked to CQs. Returning to the example above of FIG. 5C, wherein the CQ 501 on page 550 is linked to the CQ 503 on page 552: Assume that the CQ 501 with its defining page has been loaded and hence is being displayed. The user may optionally choose to display the CQ 503 and the page on which it is defined. This may be accomplished through the use of a control window or screen and by the web browser opening the page 552 in a second "tab" or window.

It is envisaged that a CQ may be executed on the local computer where the control logic 1001 resides; however, in some embodiments, it is envisaged that all the CQs defined by a plurality of users will be housed and executed by one or more remote servers or services or content providers that are coupled to or in communication with the user's local computer via the Internet.

Figure 6:
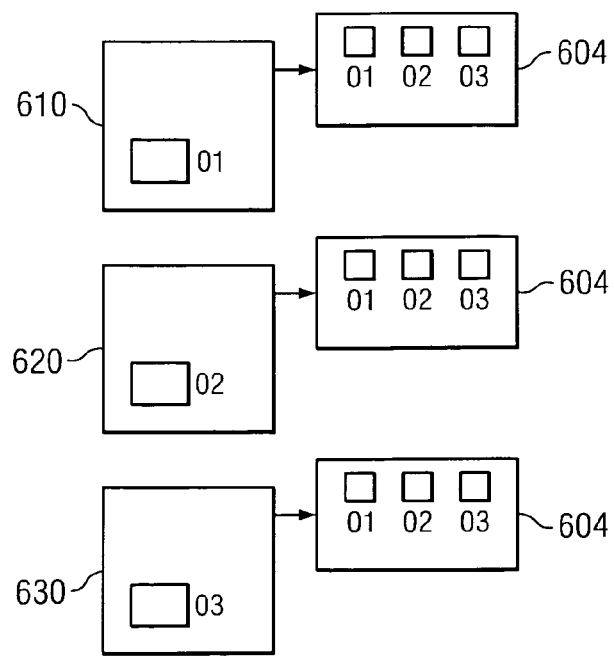
FIG. 6 illustrates navigably linking objects in accordance with the embodiments of the present invention.

For example, FIG. 6 illustrates that when any of the pages 610, 620, and 630 are loaded into a web browser, any and all of the CQs 01, 02, 03, respectively, defined on that page are also displayed and can link to other CQs. Note that 604 in FIG. 6 is a name generated by the system or assigned by the user to the cluster representing all of the three defined CQs. As noted above, the web pages 610, 620, and 630 may be distinct web pages, or they may be the same web page that has changed over time.

Figure 7:
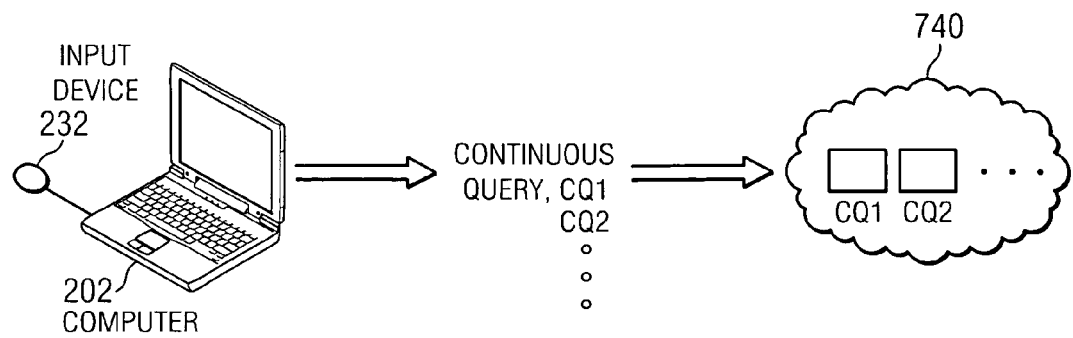
FIG. 7 shows a visual representation of a Cloud Computing Environment containing the circled objects in accordance with the embodiments of the present invention.

In some embodiments, a content or service provider may implement a Cloud Computing Environment (CCE) 740, such as that shown in FIG. 7. In particular, FIG. 7 illustrates a computer 202 having a cursor pointing device 232 coupled via the Internet to the Cloud Computing Environment (CCE) 740. The CCE includes one or more controllers that maintain the CQs—CQ1, CQ2, etc. The CQs are created, by "circling" an item on a web page, and service logic within the system then transmitting the CQ defining information to the CCE 740.

As will be apparent from the descriptions so far, a CQ denotes a group of informational objects on web pages that are to be monitored. We may thus refer to a group of objects on a web page that are being monitored as the CQ object that is being monitored. If a web page upon which a CQ has been defined is loaded into a web browser, as has been described previously, both the web page and the corresponding CQ are loaded, a process referred to as "loading a CQ." By the same token, clicking a CQ is akin to clicking the objects referred to by a CQ. And, correspondingly, browsing a CQ refers to browsing the changes over time to the attributes of the objects associated with said CQ.

Figure 8:
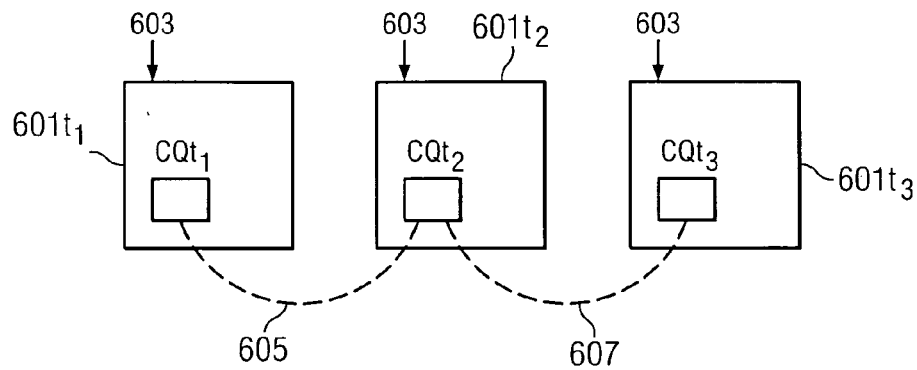
FIG. 8 show the temporal incarnations of a continuous query in accordance with the embodiments of the present invention.

This is illustrated schematically with reference to FIG. 8. Shown are web pages 601t1, 601t2, and 601t3, which include the CQs CQt1, CQt2, and CQt3, respectively. The "t[n]" suffixes used here represent different times, time t1, time t2, and time t3. Typically, a given web page may change over time, such as by information being added by a provider, as denoted by the arrows 603.

Thus, a user may start by loading the web page 601t1 and browsing the CQ CQt1 by clicking on it. If the object associated with the CQ has changed since the user first memoed it, then clicking on it causes the later-in-time web page 601t2 and changed CQ CQt2 to be loaded into the browser. This process traverses the link 605. Continuing in this way, the user may next traverse the link 607 (for the next update of the CQ CQt2 to CQt3 and the loading of the more recent web page image 601t3). Thus, the user may browse temporal incarnations of the CQs and the web pages by following these temporal linkages.

One may visualize the preceding example of FIG. 8 as browsing a "time tunnel" in which the monitored objects present themselves with attributes differing over time. Thus, embodiments of the present invention allow for users to traverse a "virtual web" history of the changes to the CQs and web pages—i.e., temporal incarnations of the CQs and their associated web pages may be browsed. In addition, different CQs on possibly distinct web pages and databases may be linked and browsed, as is illustrated in FIG. 5C.

Since the CQs may be browsed, since they are linked to other CQs which may be browsed, and since temporal incarnations of these CQs may also be browsed, the linked CQs form a separate web structure (separate from the web page structure) that may be browsed and navigated. The present invention thus envisions the creation of a "differential web" capturing the base information of interest to a user and the changes that occur to that information over time, all made available in a form that is browsable, i.e, that can be navigated using a web browser.

Figure 9:
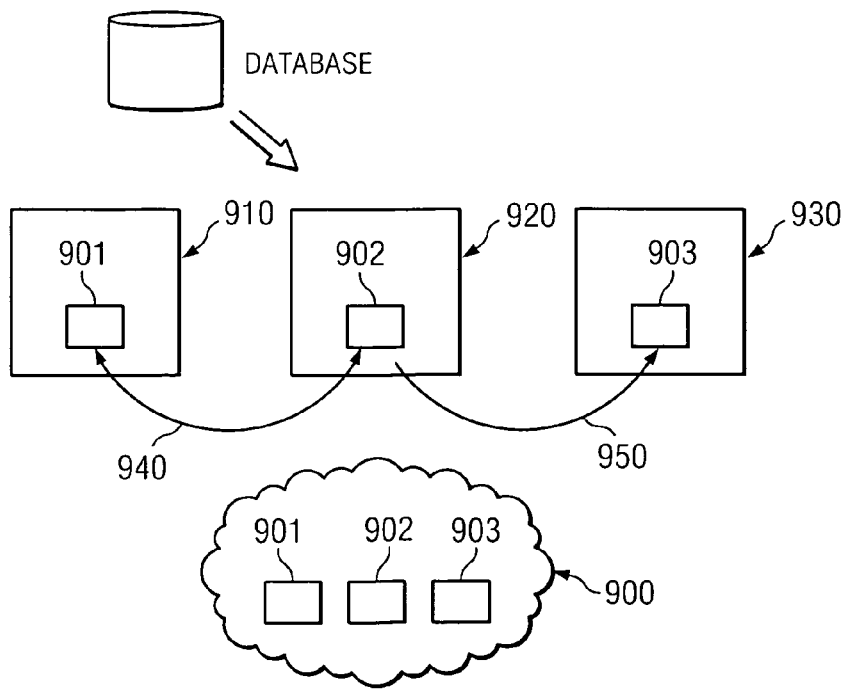
FIG. 9 shows a Cloud Computing Environment (or CCE) executing a group of continuous queries in accordance with the embodiments of the present invention.

This is illustrated in FIG. 9. Shown are three web pages 910, 920, and 930 that contain defined CQs 901, 902, and 903, respectively, and that are mutually linked at 940 and 950. The CQs 901, 902, and 903 are shown being processed and monitored by the cloud computing environment CCE 900.

Embodiments of the present invention envisage a system that can manage a large number of monitoring activities. The CCE is assigned this responsibility. Another mechanism that is envisaged is a "subscribe-notify" mechanism similar to those known to practitioners in the art. This mechanism may be employed by systems and web sites to "broadcast" events, such as updates and changes to information, to a set of previously defined subscribers or clients. Thus, in the present embodiment, the CCE may monitor individual web sites and databases for the occurrence of well-defined events in web sites and databases; and when those events take place, it can broadcast the occurrence of those events to interested subscribers. The CCE is scalable so that it can be expanded to manage a large number of monitoring events, and the subscribers can be alerted efficaciously and immediately.

Figure 10:
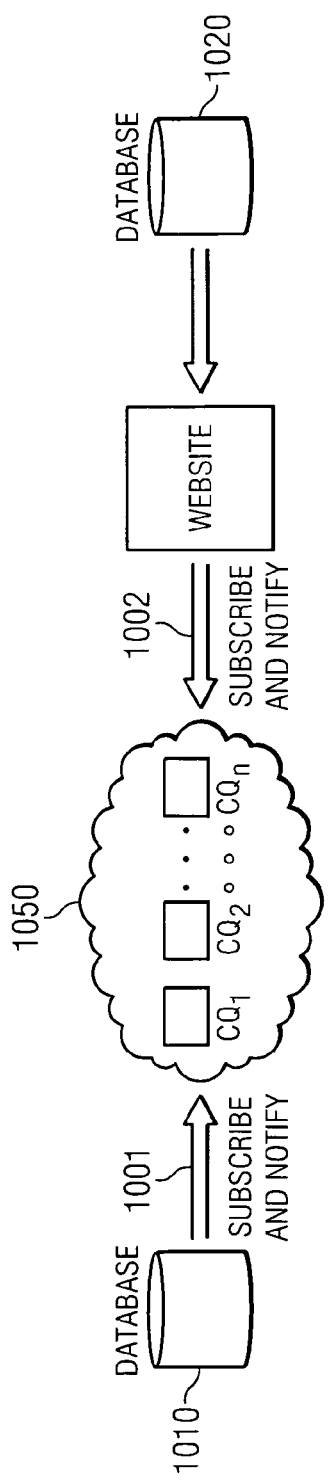
FIG. 10 shows a database system in accordance with the embodiments of the present invention.

This is shown more particularly in FIG. 10, which shows a collection of CQs, CQ1 . . . CQn, being executed by a CCE 1050 and representing selected objects residing in a database system 1010 and a website 1030 (itself coupled to database system 1020), both of which make use of a subscribe-and-notify mechanism 1001 and 1002 to communicate with the CCE 1050.

As was explained above, a cluster of objects may be assigned a name by the system or by a user. Each element of a cluster may be associated with its own meta-information encompassed, in the present embodiment, in pop-up menus. The present invention envisages that menu items in a pop-up menu may be related to other items in a pop-up menu by logical operators, such as AND, OR, and NOT; Boolean operators, such as equal (=), not-equal (/=), etc.; and by arithmetical operators, such as <, >, etc. Hence, conditions and event triggers may be defined.

Figure 11:
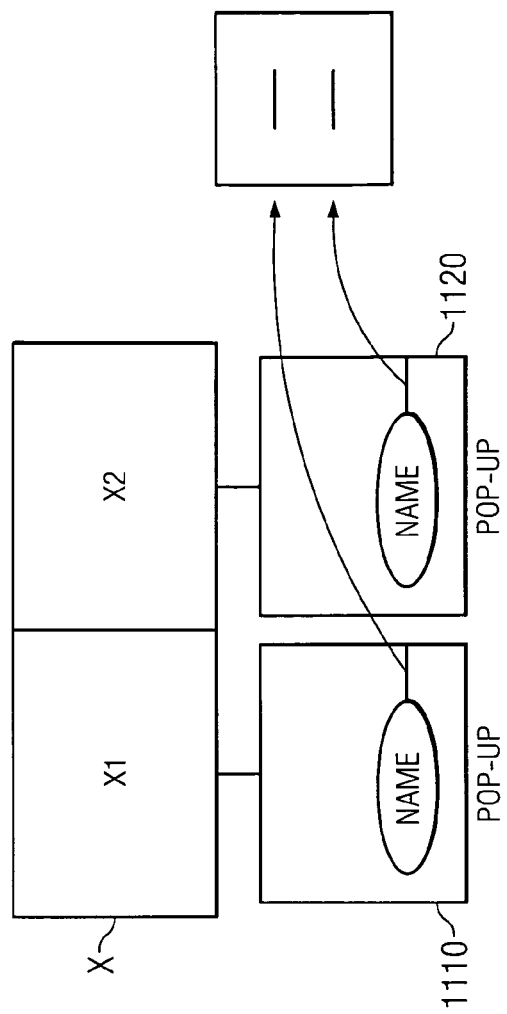
FIG. 11 shows a conditional query ("CQ") corresponding to a cluster object with individual pop-up menus containing linked attributes in accordance with the embodiments of the present invention.

FIG. 11 presents an exemplary cluster X with constituents X1 and X2 and associated pop-up menus 1110 and 1120 whose NAME meta-information can be related by the Boolean operator "=" to a user-selected name or list of names that appear in one or more of the clusters.

A CQ representing such a cluster of objects whose individual elements are chosen from distinct web pages (or databases) may be used to provide a mechanism for synchronizing and monitoring events across different web pages. Consider, by way of example, a CQ, say CQ1, defined on a first web page that contains list of the names of people on a "watch-list." Consider another CQ, say CQ2, defined on a second web page holding flight reservations. One may define a cluster CQ that "links" CQ1 and CQ2. We can then impose an equality condition on the NAME meta-information of these constituent elements of the cluster CQ; and we can choose to be alerted when the NAME equality condition is satisfied. The cluster CQ then represents two sets of monitoring activities: A first condition monitors changes to the first web page that is associated with CQ1. A second condition monitors changes to the second web page that is associated with CQ2. Finally, the cluster CQ monitors whether any of the changes to CQ1 and CQ2 satisfy the equality predicate, thus signaling that someone on the "watch" list has made a flight reservation.

In summary, a group of objects on a web page may be selected and a CQ may be associated with said group specifying a monitoring activity and process. Whenever the page in question is loaded the corresponding CQ is also loaded and may be browsed for temporal incarnations of the objects in the group. Multiple CQs may be defined on a single web page.

As noted above, more than one web page may have CQs defined on them, and two or more defined CQs may be linked together into a single cluster CQ. If a cluster CQ is loaded, i.e., a web page is loaded on which a CQ is defined that is a part of a cluster CQ, then all associated web pages are loaded in different windows of the browser, or by way of example, using tabbed browser environments.

Turning now to FIG. 12, a flowchart 1200 illustrates the operation of an embodiment of the present invention. The particular arrangement of elements shown in the flowchart 1200 is not meant to imply a fixed order to the elements; embodiments can rearrange these elements in any order that is practicable.

In a process step 1202, the system, e.g., the content or service provider, identifies a user's "circling" of an object or objects on their computer screen, in the manner described above. This identification of an object can be communicated to the content provider CCE and can initiate a memo function (in a process step 1204) to name the object and to create a CQ.

In a process step 1206, the system monitors the memoed CQs for changes to user-input or default criteria in a manner similar to that discussed above. In a process step 1208, the memoed CQs are linked, either temporally or across web pages. The linking may be automatic based on the user or may be manually selected by the user (using appropriate interfaces) or both.

In a process step 1210, the system receives a request from the user's browser for access to a web page that has such a memoed or named CQ. In a process step 1212, the system accesses its database(s), searching for CQs that are associated with the user and that will provide links to the related CQs.

In a process step 1214, the user clicks on a selected CQ. In a process step 1216, the system provides an option to the user to navigate to web pages associated with the CQ or to navigate to other CQs temporally or otherwise linked to the CQ. Thus, embodiments of the present invention can provide a user-selectable differential web based upon linkages between user-selected objects and CQs.

FIG. 13 presents a representative block diagram of an exemplary computer or processing device 1300 that is suitable for use as a user device or as a server, according to embodiments of the present invention. In particular, the computer 1300 may be a device suitable for accessing or implementing a service for clients in accordance with the various embodiments of the present invention. In some embodiments, the computer 1300 may include or may operate a web browser, web page(s), or other comparable services. The computer 1300 may be embodied as a single device or computer; a networked set or group of devices or computers; or a workstation, mainframe or host computer, etc. In some embodiments, the computer 1300 may implement one or more elements of the methods disclosed above.

The computer 1300 may include a processor, microchip, central processing unit, or computer 1302 that is in communication with or otherwise uses or includes one or more communication ports or network interfaces 1304 for communicating with user devices and/or other devices. The communication ports 1304 may include such things as telephone adapters, local area network adapters, wireless communication devices, Bluetooth technology, etc. The computer 1300 also may include an internal clock element 1306 to maintain an accurate time and date for the computer 1300, create time stamps for communications received or sent by the computer 1300, etc.

If desired, the computer 1300 may include one or more output devices 1308 such as a printer, infrared or other transmitter, antenna, display screen or monitor, text to speech converter, speaker, etc., as well as one or more input devices 1310, such as a bar code reader or other optical scanner, infrared or other receiver, antenna, magnetic stripe reader, image scanner, roller ball, touch pad, joystick, touch screen, computer keyboard, computer mouse, microphone, etc. In some embodiments, the computer 1300 may include audio I/O interface 1320 including, for example, a microphone 1324 and speaker 1326.

In addition to the above, the computer 1300 may include a memory or data storage device 1312 to store information, software, databases, documents, communications, device drivers, etc. The memory or data storage device 1312 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, an optical disk such as a compact disc or DVD and/or a hard disk. Thus, the storage device 1312 may include various combinations of moveable and fixed storage. The computer 1300 also may include memory 1314, such as ROM 1316 and RAM 1318.

The processor 1302 and the data storage device 1312 in the computer 1300 each may be, for example: (i) located entirely within a single computer or other computing device; or (ii) connected to each other by a remote communication medium, such as a serial port cable, telephone line or radio frequency transceiver. In one embodiment, the computer 1300 may be implemented as one or more computers that are connected to a remote server computer, as will be explained in greater detail below.

A conventional personal computer or workstation with sufficient memory and processing capability may be used as the computer 1300. The computer 1300 may be capable of high volume transaction processing, performing a significant number of mathematical calculations in processing communications and database searches. A microprocessor such as those manufactured by Intel Corporation may be used for the processor 1302. Other suitable processors may be available from AMD or Sun Microsystems, Inc. The processor 1302 also may be embodied as one or more microprocessors, computers, computer systems, etc.

Software may be resident and operating or operational on the computer 1300. The software may be stored on the data storage device 1312 and may include one or more control programs 1322. The control programs 1322 may implement the various services, control units, and clients described herein.

It is noted that, while illustrated as software stored in storage medium 1312, the various control modules in accordance with embodiments of the present invention may also include related firmware and/or hardware components. Thus, the figure is exemplary only.

The control program 1322 may control the processor 1302. The processor 1302 may perform instructions of the control program 1322, and thereby operate in accordance with the methods described in detail herein. The control programs may be stored in a compressed, uncompiled and/or encrypted format. The control programs furthermore include program elements that may be necessary, such as an operating system, a database management system and device drivers for allowing the processor 1302 to interface with peripheral devices, databases, etc. Appropriate program elements are known to those skilled in the art, and need not be described in detail herein.

According to some embodiments, the instructions of the control program may be read into a main memory from another computer-readable medium, such as from the ROM 1316 to the RAM 1318. Execution of sequences of the instructions in the control program causes the processor 1302 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 1302, communication ports 1304, clock 1306, output device 1308, input device 1310, data storage device 1312, ROM 1316 and RAM 1318 may communicate or be connected directly or indirectly in a variety of ways. For example, the processor 1302, communication ports 1304, clock 1306, output device 1308, input device 1310, data storage device 1312, ROM 1316 and RAM 1318 may be connected via a bus 1334.

While specific implementations and hardware/software configurations for the computer 1300 have been illustrated, it should be noted that other implementations and hardware configurations are possible and that no specific implementation or hardware/software configuration is needed. Thus, not all of the components illustrated in FIG. 13 may be needed for the computer 1300 implementing the methods disclosed herein.

While the present inventions have been illustrated by a description of various embodiments and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application.

What is claimed is:

1. A method, comprising:
specifying one or more objects as user-selectable predetermined objects on an information screen for monitoring, the specifying including configuring the one or more objects as browsable in response to an encircling gesture;
subsequently identifying the encircling gesture, the encircling gesture encircling the one or more objects displayed on the information screen for defining one or more conditional queries based on the one or more objects and for navigably linking the one or more conditional queries to identify changes associated with encircled objects over time;
accessing meta-information associated with the one or more objects, the meta-information defining conditional attributes with predetermined conditions for monitoring items associated with the one or more objects, the accessing meta-information comprising causing a display of one or more links made browsable from the one or more objects in response to the encircling gesture;
receiving a selection of the predetermined conditions associated with the one or more predetermined objects and the conditional attributes from the links made browsable;
monitoring changes in the predetermined conditions; and
notifying a user of the changes.

2. A method in accordance with claim 1, the conditional query based on a circled object, the conditional query comprising one or more browsable objects linked to other objects.

3. A method in accordance with claim 2, further comprising navigably linking a plurality of conditional queries.

4. A method in accordance with claim 3, wherein the navigably linking includes hyperlinking encircled objects from different web pages.

5. A method in accordance with claim 3, wherein the navigably linking includes identifying changes in the meta-information associated with encircled objects over time and temporally hyperlinking encircled objects whose meta-information has changed.

6. A method in accordance with claim 3, wherein the identifying an encircling gesture includes identifying a bifurcation distance of motion with a cursor pointing device.

7. A system, comprising:
a control unit configured to specify one or more user-selectable predetermined objects as browsable in response to an encircling gesture;
a recognition unit configured to identify the encircling gesture, the encircling gesture encircling the one or more predetermined objects on an information screen for defining one or more conditional queries based on the one or more objects and for navigably linking the one or more conditional queries to identify changes associated with encircled objects over time;
a meta-information database associated with the one or more predetermined objects, the meta-information database storing meta-information defining conditional attributes with predetermined conditions for monitoring items associated with the one or more predetermined objects and causing a display of one or more links made browsable in response to the encircling gesture;
a meta-information monitor configured to receive a selection of the predetermined conditions associated with the one or more predetermined objects and the conditional attributes from the links made browsable, monitor changes in the predetermined conditions, and notify a user of the changes.

8. A system in accordance with claim 7, the control unit configured to define a conditional query based on an encircled object, the conditional query comprising one or more browsable objects linked to other objects.

9. A system in accordance with claim 8, further comprising a control unit configured to navigably link a plurality of conditional queries.

10. A system in accordance with claim 9, wherein the control unit is configured to hyperlink encircled objects from different web pages.

11. A system in accordance with claim 9, wherein the control unit is configured to identify changes in encircled objects over time and temporally hyperlink encircled objects that have changed.

12. A system in accordance with claim 9, wherein the recognition unit is configured to identify a bifurcation distance of motion with a cursor pointing device when identifying the circular gesture.

13. A system in accordance with claim 11, wherein the changes include price changes.

14. A system in accordance with claim 11, wherein the changes include coding changes.

15. A method, comprising:
specifying one or more objects as user-selectable predetermined objects on an information screen for monitoring, the specifying including configuring the one or more objects as browsable in response to a circle gesture;
identifying a subsequent circle gesture, the circle gesture encircling one or more predetermined objects on a web page for defining one or more conditional queries based on the one or more objects and for navigably linking the one or more conditional queries to identify changes associated with encircled objects over time;
accessing meta-information associated with the one or more predetermined objects, the meta-information defining conditional attributes with predetermined conditions for monitoring items associated with the one or more predetermined objects and causing a display of one or more links made browsable in response to the circle gesture;
monitoring the meta-information for changes;
linking web pages that have had circular gestures identified thereon; and
linking web pages that have temporally different objects identified thereon.

16. A method in accordance with claim 15, wherein the monitoring includes receiving meta-information parameters from the circular gesture source.

17. A system, comprising:
a recognition unit configured to identify an input gesture, the input gesture encircling one or more predetermined objects on a screen for defining one or more conditional queries based on the one or more objects and for navigably linking the one or more conditional queries to identify changes associated with encircled objects over time;
a control unit operably coupled to the recognition unit and configured to provide a meta-information interface for selectively receiving criteria for monitoring items associated with the one or more predetermined objects;
a monitoring unit configured to monitor the items in accordance with received criteria and provide a notification if the criteria are met; and
a navigation control unit configured to navigably link web pages made browsable and associated with the items in response to the input gesture.

18. A system in accordance with claim 17, wherein the navigation control unit is configured to link web pages associated with the items over time.

19. A system in accordance with claim 17, wherein the navigation control unit is configured to link web pages associated with changed items.

20. A system in accordance with claim 17, wherein the navigation control unit is configured to link web pages associated with unrelated items that have been recognized as being associated with objects selected by a particular user with the input gesture.

* * * * *